US005200942A

United States Patent [19]

Hosobata et al.

[11] Patent Number: 5,200,942
[45] Date of Patent: Apr. 6, 1993

[54] FOCUS ADJUSTING APPARATUS FOR AN OPTICAL PICKUP APPARATUS

[75] Inventors: Nobuhiko Hosobata; Yukio Yoshikawa; Masaaki Takagi, all of Tokyo, Japan

[73] Assignees: Copal Company Ltd., Tokyo; Fujitsu Ltd., Kanagawa, both of Japan

[21] Appl. No.: 689,282
[22] PCT Filed: Oct. 15, 1990
[86] PCT No.: PCT/JP90/01325
  § 371 Date: Jul. 30, 1991
  § 102(e) Date: Jul. 30, 1991
[87] PCT Pub. No.: WO91/06097
  PCT Pub. Date: May 2, 1991

[30] Foreign Application Priority Data
  Oct. 14, 1989 [JP] Japan .................. 1-267519
  Oct. 19, 1989 [JP] Japan .................. 1-272066

[51] Int. Cl.⁵ .............................. G11B 7/09
[52] U.S. Cl. ...................... 369/44.41; 369/44.42; 369/44.36
[58] Field of Search ........... 369/44.41, 44.42, 44.12, 369/44.14, 44.25, 44.34, 44.32, 44.37, 44.11, 112, 105, 110, 44.29, 44.35, 44.36

[56] References Cited

U.S. PATENT DOCUMENTS

| | | | |
|---|---|---|---|
| 4,742,218 | 5/1988 | Nakamura et al. | 369/44.42 |
| 4,823,331 | 4/1989 | Yoshitoshi et al. | 369/44.12 |
| 4,862,440 | 9/1989 | Miyamoto et al. | 369/44.12 |
| 4,873,678 | 10/1989 | Nakamura et al. | 369/44.14 |
| 4,945,525 | 7/1990 | Yamamoto et al. | 369/44.41 |
| 4,954,702 | 9/1990 | Kurogama et al. | 369/44.14 |

FOREIGN PATENT DOCUMENTS 52-134705 11/1977 Japan .
53-100203 9/1978 Japan .
2-94118 4/1990 Japan .

Primary Examiner—Aristotelis Psitos
Assistant Examiner—Muhammad Edon
Attorney, Agent, or Firm—Wenderoth, Lind & Ponack

[57] ABSTRACT

On a focus adjusting apparatus of an optical pickup apparatus, light reflected by a recording medium is concentrated into two focuses by an optical divider. First and second optical detectors are disposed so that a focus adjusting mechanism is controlled in accordance with the output of both detectors. Each optical detector includes central and peripheral light receiving planes. In a first system, the focus adjusting mechanism is controlled so that a difference of a ratio of a quantity of received light of the central light receiving plane to the whole quantity of received light of both the central and peripheral light receiving planes of the first optical detector and the same ratio of the second optical detector is reduced to 0. Even if unbalnce occurs in the quantities of incident light to both the optical detectors, the unbalanced component is canceled between a denominator and a numerator of the above noted ratio. In a second system, control is effected by the difference in the central quantities of received light of both optical detectors. The difference in the whole quantities of received light of both optical detectors is calcula'ed and a correction value is calculated from the difference in the whole quantities of received light. Since the calculated correction value is subtracted from the calculated difference any unbalance in the quantity of incident light to both the optical detectors is removed.

8 Claims, 5 Drawing Sheets

FOCUS ADJUSTING APPARATUS FOR AN OPTICAL PICKUP APPARATUS

BACKGROUND OF THE INVENTION

1. Field of the Invention

The present invention relates to a focus adjusting apparatus for an optical pickup apparatus for use in an optical magnetic disk apparatus or the like, and more particularly to an improvement of the focus adjusting apparatus for concentrating light reflected by a recording medium to two focuses through an optical divider and for positioning a focus adjusting mechanism by outputs of two optical detectors disposed before one focus and after the other focus, respectively.

2. Description of the Prior Art

Various focus adjusting apparatuses for an optical pickup apparatus used in an optical magnetic apparatus or the like are heretofore known, while the present invention is particularly directed to the focus adjusting apparatus which concentrates light reflected by a recording medium to two focuses through an optical divider and positions a focus adjusting mechanism in accordance with quantities of detected light of two optical detectors disposed before one focus and after the other focus, respectively.

Referring to FIGS. 1 and 13, a basic principle of the focus adjusting apparatus to which the present invention is directed is described.

In the specification, a tracking direction, a rotational direction of a disk and a focusing direction are handled as an X axis, a Y axis and a Z axis, respectively.

Referring to FIG. 1, light emitted from a semiconductor laser 1 is collimated by a collimator lens 2 and enters an optical block 3 including beam shaping prisms 3a and 3b and a beam splitter (a boundary G between glasses 3b and 3c serves as the beam splitter).

Generally, since a section of collimated a laser beam shaped by the collimator lens 2 has the elliptical distribution of intensity in accordance with characteristics of the laser beam, the section of the collimated laser beam is corrected into a round section by the beam shaping prism 3a.

More particularly, it is assumed that the major axis of the ellipse is vertical to the paper and when the laser beam enters a plane E of the beam shaping prism 3a made of, for example, material BK7 (BSC7) with an incident angle $\theta$ and is refracted with a refraction angle $\phi$, the section of beam is spread in the direction of the minor axis by $\cos \phi / \cos \theta$ and becomes generally round.

Further, a wavelength $\lambda$ of laser beam generally varies slightly in accordance with the temperature and the intensity of the emitted light and the refraction angle $\phi$ thereof also varies in accordance with the temperature and the intensity of emitted light.

Thus, the prism 3b made of glass of material SF11 (FD11), for example, having the waveform dependency and the temperature dependency with respect to the refractive index is provided and the laser beam is caused to enter the boundary F between the glasses 3a and 3b with an incident angle $\alpha$ and to be refracted with a refraction angle $\beta$ so that the waveform dependency and the temperature dependency of the laser beam are compensated for.

The boundary G between the glasses 3b and 3c constitutes a non-phase beam splitter. 70 to 80 percent of the polarization P of the laser beam are transmitted through the boundary G and most of the polarization S is reflected by the boundary G.

An inclined plane H of 45 degrees is formed at the bottom of the glass 3c and is provided with a coating. The polarization P transmitted through the boundary G enters the inclined plane H with an incident angle of 45 degrees and is totally reflected with non/phase shift. The totally reflected light beam is emitted from the optical block 3 toward the Z axis. The emitted light from the optical block 3 is focused on a disk not shown by an objective lens 4 and the reflected light by the disk is again collimated by the objective lens 4. The collimated light enters the glass 3c and is totally reflected by the inclined plane H to enter the boundary G.

In the case of the optical magnetic disk system, when the beam spot is reflected by a recording plane of the disk, the polarization plane thereof is rotated by a vertical magnetization forming an information pit by a Kerr angle.

Accordingly, when the reflected light by the recording plane of the disk enters the boundary G, 20 to 30 percent of the polarization P and the polarization S are reflected and the reflected light enters a ½-wavelength plate 5 so that the polarization plane is inclined by 45 degrees with respect to a beam splitter 7 described later.

Light emitted from the ½-wavelength plate 5 passes through a focusing lens 6 into the beam splitter 7 to be divided by the beam splitter 7 into a P component and an S components which are concentrated on two focuses F and F', respectively.

A detector 8 is disposed before the focus F and a detector 9 is disposed after the focus F'. Light receiving planes A and B having an equal diameter are formed in the vicinity of an optical axis of the detectors 8 and 9, respectively. In FIG. 1, sides and fronts of the detectors 8 and 9 are shown.

When spot diameters of light beams S incident on the detectors 8 and 9 are defined as $\phi$SA and $\phi$SB, respectively, the spot diameters $\phi$SA and $\phi$SB upon focused exceed the diameter of the light receiving planes A and B sufficiently.

Further, preferably, when quantities of received light of the light receiving planes A and B are defined as a and b, a distance of the detector 8 to the focus F and a distance of the detector 9 to the focus F' are set so that the quantities a and b of received light upon focused are substantially identical.

With such a mechanism, when the disk plane is nearer with respect to the objective lens 4 than the focus point, the reflected light beams are concentrated farther than the focuses F and F'.

Accordingly, in this case, there is a relationship of $\phi$SA > $\phi$SB between the spot diameters $\phi$SA and $\phi$SB of the light beams.

This means that the light entering the light receiving plane A is spread as compared with the light entering the light receiving plane B and accordingly there is a relationship of a < b between quantities a and b of detected light of the light receiving plane A and B.

On the other hand, when the disk plane is farther with respect to the objective lens 4 than the focus point, the reflected light beams are concentrated before the focuses F and F'.

Accordingly, in this case, there is a relationship of $\phi$SA < $\phi$SB between the spot diameters $\phi$SA and $\phi$SB of the light beams entering the detectors 8 and 9, and since light entering the light receiving plane B is spread as compared with light entering the light receiving plane A, there is a relationship of a>b between quantities a and b of detected light of the light receiving planes A and B.

Accordingly, as shown in FIG. 13, outputs of the light receiving planes A and B are applied to a differential amplifier 12 to drive the objective lens 4 so that a difference a−b of the quantities of detected light of the planes A and B is reduced to 0, to thereby attain focusing. In FIG. 13, numeral 13 denotes a driver including a compensation circuit, and numeral 14a denotes a focusing coil.

As described above, in the focus adjusting apparatus in which the reflected light from the recording medium is distributed onto the two detectors by means of the beam splitter and the servo-system is operated by the difference between the quantities of detected light of the two detectors, it is a precondition for the normal operation that the quantities of detected light of the two detectors are balanced upon focused.

Thus, in order to balance the quantities of detected light of the two detectors 8 and 9, generally, positioning of the ½-wavelength plate 5 is made, while there is a problem that the positioning of the ½-wavelength plate 5 requires extremely accurate adjustment.

Further, even when the positioning of the ½-wavelength plate 5 is made accurately, unbalance between the quantities of detected light of the two detectors occurring by influence of crosstalk between tracks and double refraction on a disk plane can not be treated by a conventional system and there is no guarantee that focusing accuracy can not be always ensured.

SUMMARY OF THE INVENTION

The present invention has been made in view of the above problem and an object of the present invention is to provide a focus adjusting apparatus capable of attaining focusing without influence of unbalanced quantities of detected light of two detectors.

A focus adjusting apparatus of an optical pickup apparatus according to the present invention has a precondition that light focused on a recording medium by a focusable objective lens and reflected on the recording medium is concentrated to first and second focuses through the objective lens, a focusing lens and an optical divider and a first optical detector is disposed before the first focus with a second optical detector being disposed after the second focus so that the objective lens is servo-controlled by outputs of the first and second optical detectors.

According to a first preferable aspect, the first optical detector includes a central light receiving plane having an optical axis of the first optical detector centered therein and having a smaller area than that of a light spot irradiated by the focusing lens and a peripheral light receiving plane disposed at the periphery of the central light receiving plane and having a larger area including the central light receiving plane than that of the light spot. The second optical detector includes a central light receiving plane having an optical axis of the second optical detector centered therein and having a smaller area than that of a light spot irradiated by the focusing lens and a peripheral light receiving plane disposed at the periphery of the central light receiving plane and having a larger area including the central light receiving plane than that of the light spot. There are provided means for calculating a ratio of the quantity of received light of the central light receiving plane to the whole quantity of received light of the central light receiving plane and the peripheral light receiving plane of the first optical detector, means for calculating a ratio of the quantity of received light of the central light receiving plane to the whole quantity of received light of the central light receiving plane and the peripheral light receiving plane of the second optical detector, and servo driving means for controlling the objective lens so that a difference between the ratio of the quantity of received light of the central light receiving plane to the whole quantity of received light of the central light receiving plane and the peripheral light receiving plane of the first optical detector and the ratio of the quantity of received light of the central light receiving plane to the whole quantity of received light of the central light receiving plane and the peripheral light receiving plane of the second optical detector is reduced to 0.

In the first preferable aspect, light reflected by the recording medium is divided by the optical divider into two light beams and the two light beams are projected on the first optical detector disposed before the first focus and the second optical detector disposed after the second focus, respectively.

The whole quantity of received light equal to a sum of the quantity of received light of the central light receiving plane and the quantity of received light of the peripheral light receiving plane of each of the optical detectors is constant regardless of variation of focus, while the quantity of received light of the central light receiving plane varies in accordance with a degree of diffusion of light caused by variation of focus.

Accordingly, if the objective lens is servo controlled so that the difference between the ratio of the quantity of received light of the central light receiving plane to the whole quantity of received light of the first optical detector and the ratio of the quantity of received light of the central light receiving plane to the whole quantity of received light of the second optical detector is reduced to 0, the objective lens always tracks a focused point.

Further, when unbalance occurs in the whole quantities of received light of both the optical detectors due to error of adjustment of the ½-wavelength plate and crosstalk, since unbalance having the same ratio as that of the whole quantities occurs in the quantities of received light of the central light receiving planes of both the optical detectors so that varied components of the quantities of received light are canceled in the relation of a numerator/denominator, there is no influence of unbalanced quantities of received light of both the optical detectors.

According to a second preferable aspect, the first optical detector includes a central light receiving plane having an optical axis of the first optical detector centered therein and having a smaller area than that of a light spot irradiated by the focusing lens and a peripheral light receiving plane disposed at the periphery of the central light receiving plane and having a larger area including the central light receiving plane than that of the light spot. The second optical detector includes a central light receiving plane having an optical axis of the second optical detector centered therein and having a smaller area than that of a light spot irradiated by the focusing lens and a peripheral light receiving plane disposed at the periphery of the central light receiving plane and having a larger area including the central light receiving plane than that of the light spot. There are provided means for calculating a central difference of a quantity of received light which is a difference between a quantity of received light of the central light receiving plane of one optical detector and a quantity of received light of the central light receiving plane of the other optical detector, means for calculating the whole difference of a quantity of received light which is a difference between the whole quantity of received light of the central light receiving plane and the peripheral light receiving plane of one optical detector and the whole quantity of received light of the central light receiving plane and the peripheral light receiving plane of the other optical detector, means for calculating a correction value by multiplying the calculated whole difference of the quantity of received light by a component ratio of the central quantity of received light to the whole quantity of received light in the focused point, and servo driving means for controlling the objective lens so that a value obtained by subtracting the calculated correction value from the central differences of quantity of received light of the respective optical detectors is reduced to 0.

Even in the second preferable aspect, light reflected by the recording medium is divided by the optical divider into two light beams and the two light beams are projected on the first optical detector disposed before the first focus and the second optical detector disposed after the second focus, respectively.

The whole quantity of received light equal to a sum of the quantity of received light of the central light receiving plane and the quantity of received light of the peripheral light receiving plane of each of the optical detectors is constant regardless of variation of focus, while the quantity of received light of the central light receiving plane varies in accordance with a degree of diffusion of light caused by variation of focus.

In the second preferable aspect, basically, the objective lens is driven by the central differences of quantity of received light of the respective optical detectors, while the central quantities of received light contain unbalanced components in the quantities of received light when there is unbalance in the quantities of received light between the respective optical detectors.

As described above, since the whole quantity of received light equal to a sum of the quantity of received light of the central light receiving plane and the quantity of received light of the peripheral light receiving plane of the respective optical detectors is not influenced by variation of focus but is influenced by unbalance of the quantity of received light, if a difference in the whole quantities of received light of the respective optical detectors is calculated, the calculated difference represents the unbalance in the whole quantities of received light of the respective optical detectors.

Further, since the diameter of the light spot projected on the respective optical detectors has a fixed value in the focused point, a component ratio of the central quantity of received light to the whole quantity of received light has also a fixed numerical value. Accordingly, if a value obtained by multiplying the fixed component ratio by the calculated whole difference of quantity of received light is utilized as a correction value, the correction value represents a component corresponding to the central light receiving plane of the whole difference quantity of received light.

Values obtained by subtracting the calculated correction value from the central differences of quantity of received light of the respective optical detectors are utilized as servo output and accordingly unbalanced components of light quantity of the respective optical detectors are removed from the servo output in the vicinity of the focused point.

DESCRIPTION OF THE PREFERRED EMBODIMENTS

A first embodiment of the present invention is now described in detail with reference to drawings.

Figure 1:
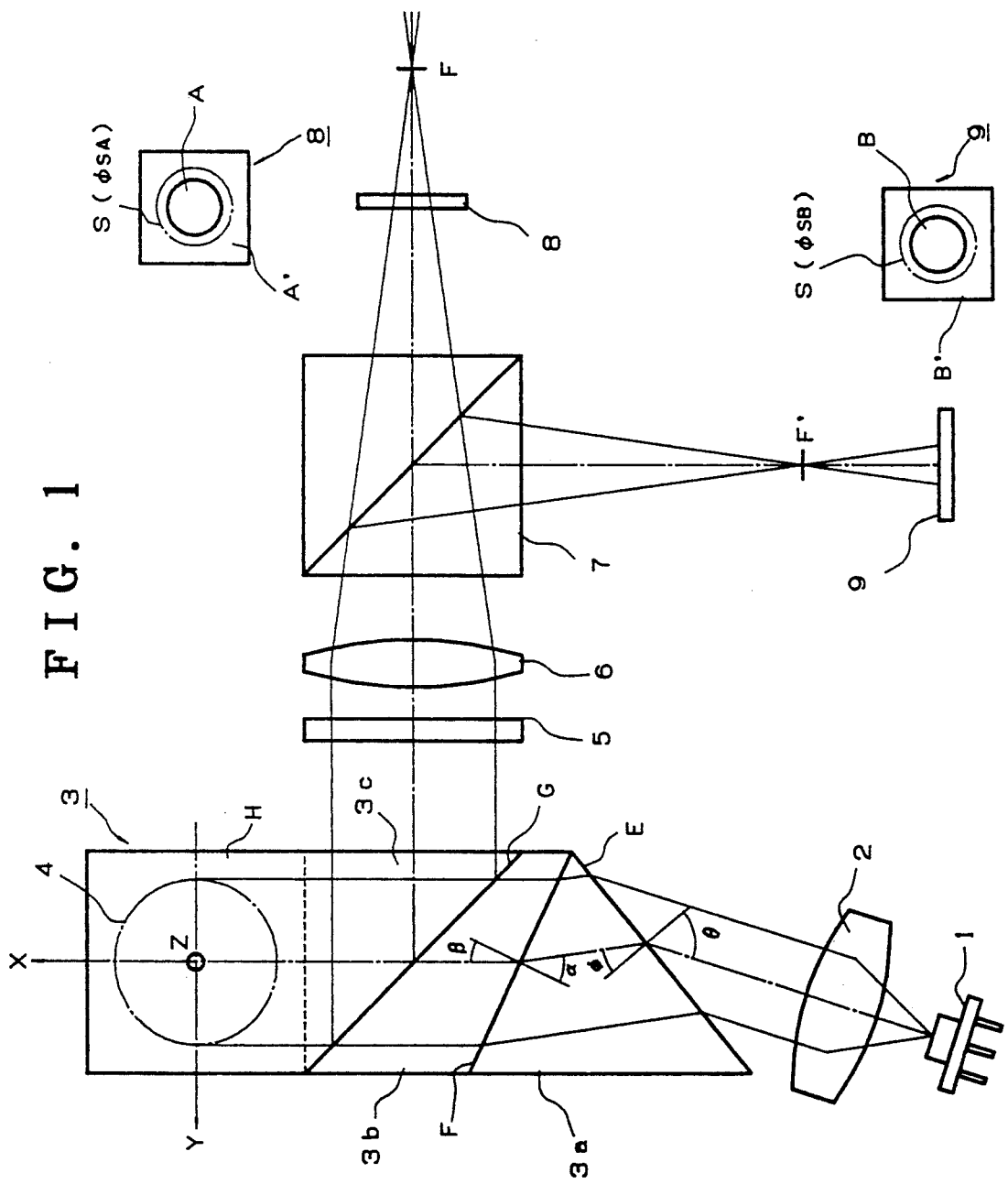
FIG. 1 schematically illustrates optical paths of an optical pickup apparatus according to an embodiment of the present invention.
Figure 3:
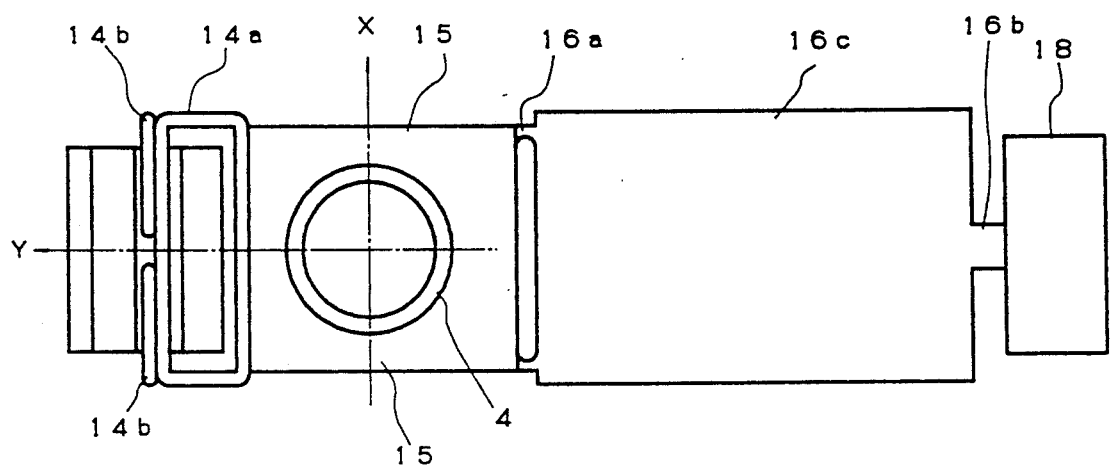
FIG. 3 is a plan view of an actuator portion of the optical pickup apparatus of FIG. 1.
Figure 4:
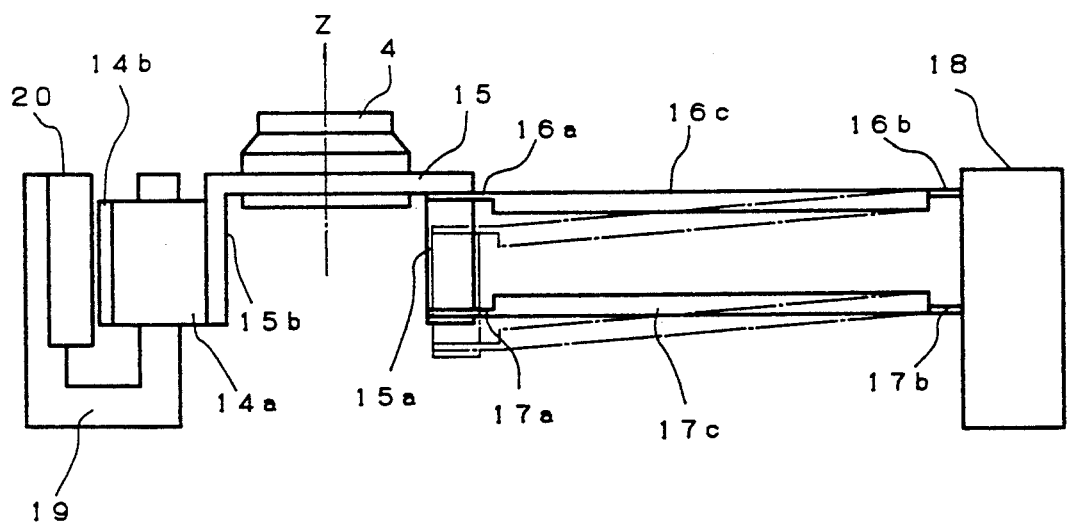
FIG. 4 is a front view of the actuator portion of the optical pickup apparatus of FIG. 1.

An optical structure of an apparatus of the present invention is basically common to the above described conventional apparatus and accordingly FIG. 1 is used for description of the embodiment. The whole structure of an optical pickup apparatus according to the embodiment is further shown in a perspective view of FIG. 2 and detail of an actuator for driving an objective lens 4 is shown in a plan view of FIG. 3 and in a front view of FIG. 4.

Figure 2:
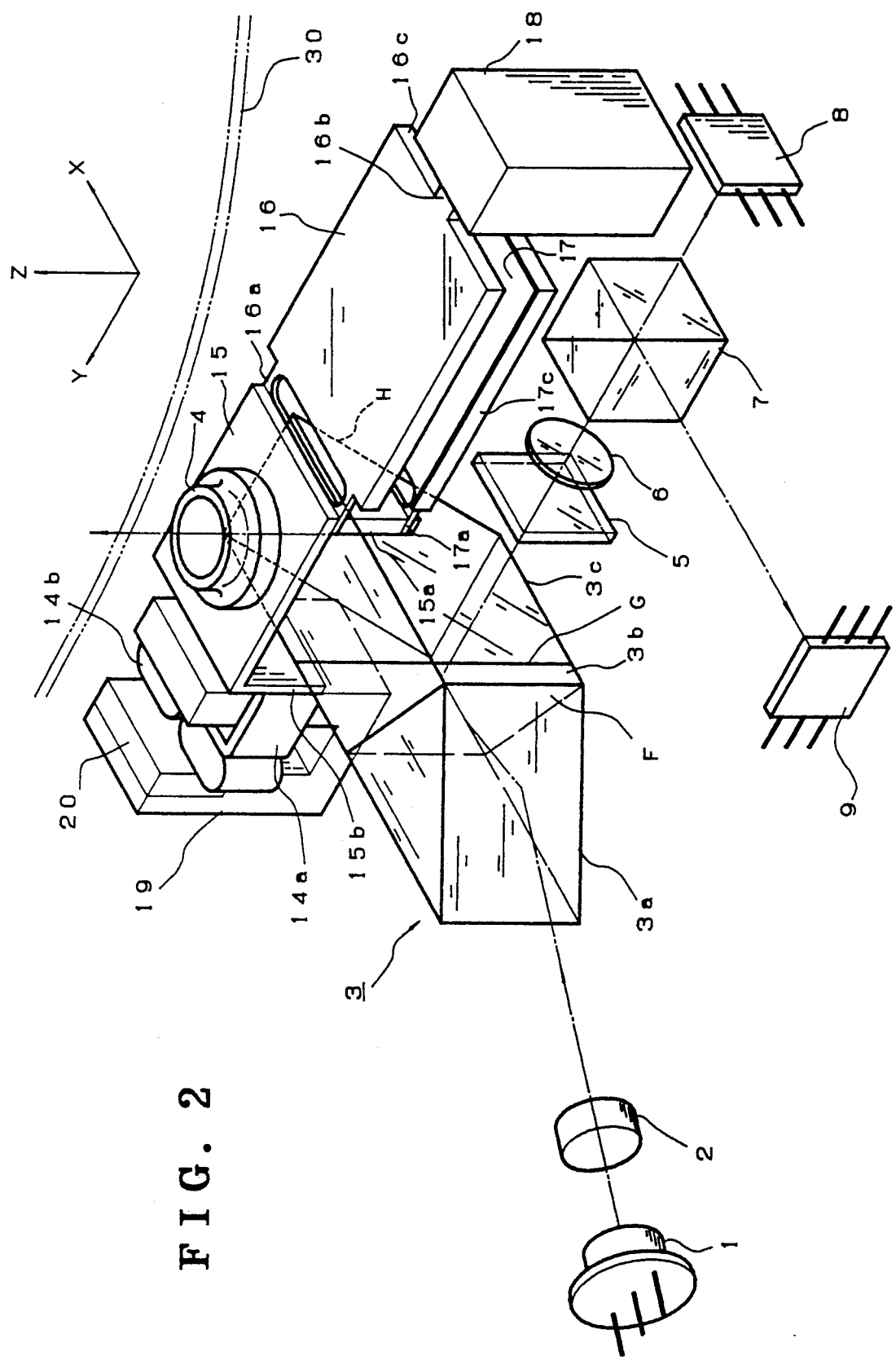
FIG. 2 is a perspective view of the optical pickup apparatus of FIG. 1.

In FIG. 2, elements described above are designated by the same numerals as those of FIG. 1 and repeated description thereof is omitted. Elements not described yet will be described in detail.

Numeral 15 denotes an actuator main body fixedly attached to the objective lens 4. Connection plates 16 and 17 having resilience are coupled to one leg 15a of the actuator main body 15 through hinges 16a and 17a, respectively.

The other ends of the connection plates 16 and 17 are coupled to a mounting member 18 fixed to an optical seek mechanism not shown through hinges 16b and 17b, respectively, so that the connection plates 16 and 17 are parallel to each other.

The connection plates 16 and 17 themselves have resilience, while reinforcing bend portions 16c and 17c are formed in outer edge portions of the connection plates. Accordingly, even if force for moving the actuator main body 15 in the Z-axis direction is applied to the actuator main body 15, the connection plate 16 and 17 themselves are not bent substantially and the four hinges 16a, 17a, 16b and 17b are bent so that the actuator main portion 15 is moved in the Z-axis direction without inclination of the actuator main portion 15 with respect to an optical axis of the objective lens 4.

A focus coil 14a is fixedly mounted to the other leg 15b of the actuator main portion 15 and a U-shaped yoke 19 fixed attached to the optical seek mechanism is inserted into a winding shaft of the focus coil 14a. A magnet 20 is fixedly mounted to the yoke 19.

Accordingly, when the focus coil 14a is energized, a force occurs for moving the actuator main portion 15 in the Z-axis direction.

Numeral 14b denotes a tracking coil. When the tracking coil 14b is energized, a force occurs for pivoting the actuator main portion 15 about the hinges 16b and 17b (that is, force for moving the actuator main portion 15 in the X-axis direction), while since the present invention is directed to focus control, the tracking coil 14b is not directly concerned with the present invention.

As a characteristic point of the present invention, as shown in FIG. 1, the detectors 8 and 9 include peripheral light receiving planes A' and B' disposed at the periphery of central light receiving planes A and B and having a magnitude capable of sufficiently covering a light spot S even in any condition in a focus adjusting area.

Figure 5:
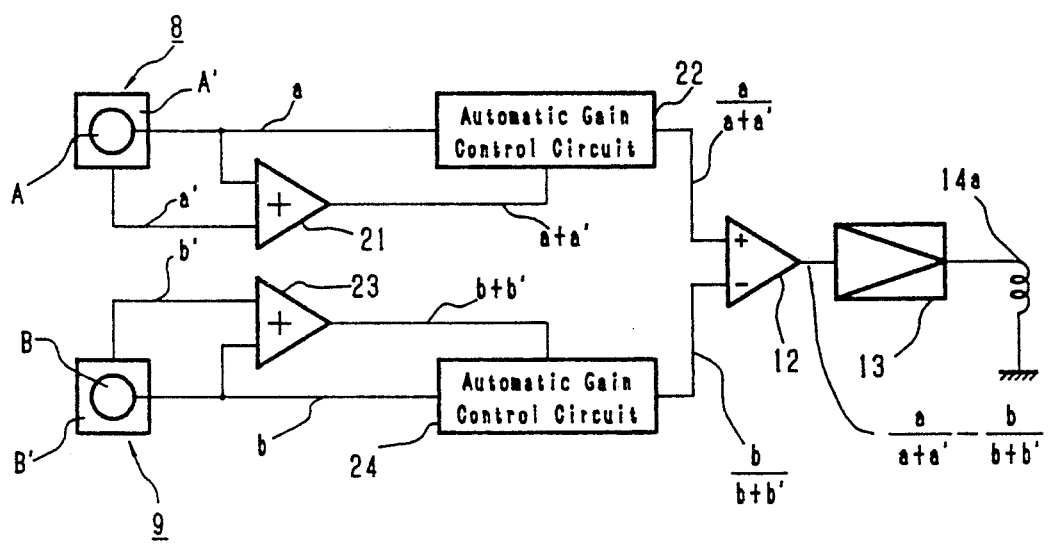
FIG. 5 is a circuit diagram of a focusing servo system of an optical pickup apparatus according to a first embodiment of the present invention.

FIG. 5 shows an example of a driving circuit which is a feature of the present invention.

Numeral 21 denotes an adder for adding an output a of the central light receiving plane A and an output a' of the peripheral light receiving plane A' of the detector 8.

An output (a+a') of the adder 21 is supplied to a control input of a divider 22 using an automatic gain control circuit.

The output a of the central light receiving plane A is also supplied to the divider 22 and an output a/(a+a') of the divider 22 represents a ratio of the central quantity a of received light to the whole quantity of received light of the detector 8.

Numeral 23 denotes an adder for adding an output b of the central light receiving plane B and an output b' of the peripheral light receiving plane B' of the detector 9.

An output (b+b') of the adder 23 is supplied to a control input of a divider 24 using an automatic gain control circuit.

The output b of the central light receiving plane B is also supplied to the divider 24 and an output b/(b+b') of the divider 24 represents a ratio of the central quantity b of the received light to the whole quantity of received light of the detector 9.

The outputs of the dividers 22 and 24 are supplied to a differential amplifier 12 to produce a focus error signal FES, which is applied to a driver 13 to control the focus coil 14a.

As apparent from the foregoing description, the focus error signal FES is given by the following (equation-1):

$$FES = \frac{a}{a+a'} - \frac{b}{a+b'} \quad \text{(Equation-1)}$$

The operation of the embodiment is described below with reference to the above description and FIGS. 6 to 11.

Figure 6:
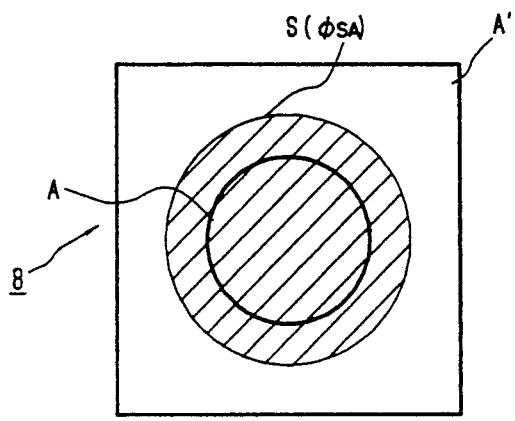
FIG. 6 illustrates a projected pattern on a detector 8 in the case where a disk is at a focused position of an objective lens.
Figure 7:
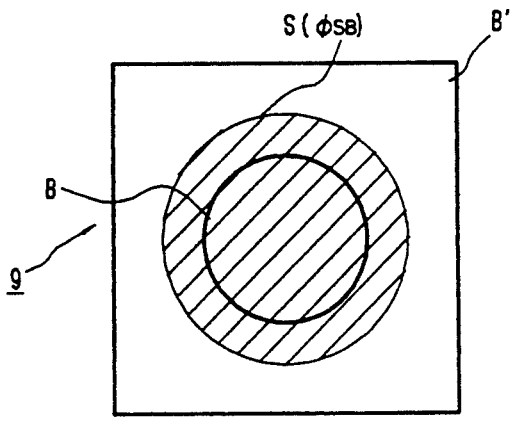
FIG. 7 illustrates a projected pattern on a detector 9 in the case where a disk is at a focused position of an objective lens.
Figure 8:
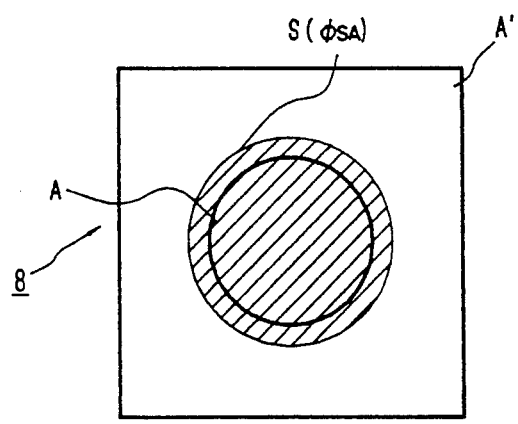
FIG. 8 illustrates a projected pattern on a detector 8 in the case where a disk is at a farther distance than a focused position of an objective lens.
Figure 9:
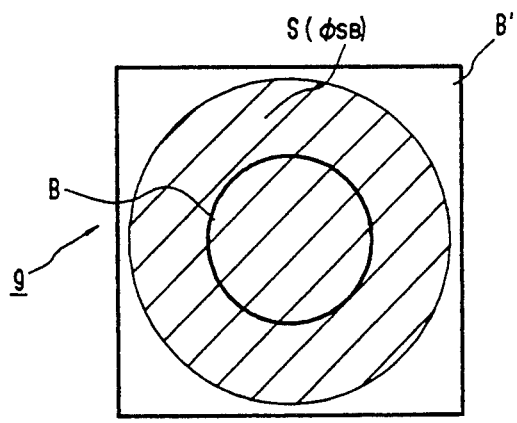
FIG. 9 illustrates a projected pattern on a detector 9 in the case where a disk is at a farther distance than a focused position of an objective lens.
Figure 10:
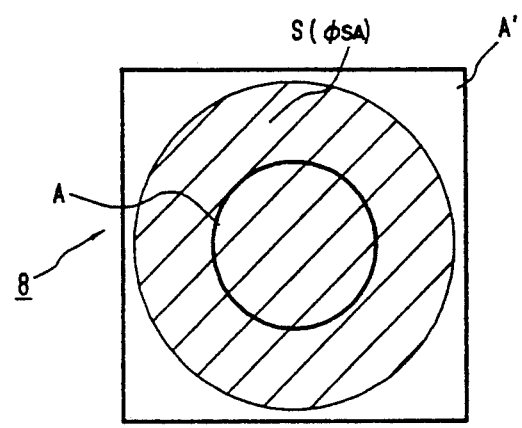
FIG. 10 illustrates a projected pattern on a detector 8 in the case where a disk is at a nearer distance than a focused position of an objective lens.
Figure 11:
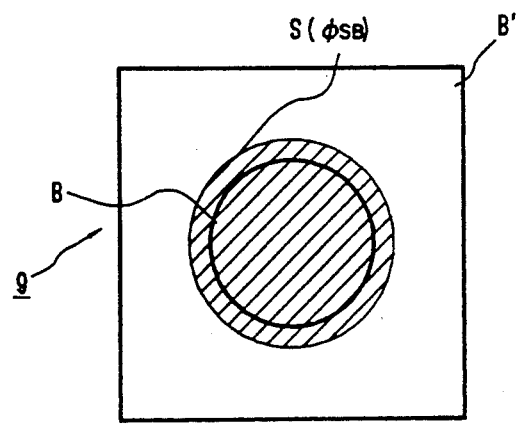
FIG. 11 illustrates a projected pattern on a detector 9 in the case where a disk is at a nearer distance than a focused position of an objective lens.

FIGS. 6 and 7 show the detectors 8 and 9 in the case where the disk plane 30 is at a focused position of the objective lens 4, respectively; FIGS. 8 and 9 show the detectors 8 and 9 in the case where the disk plane is at a farther distance than a focused position of the objective lens 4, respectively, and FIGS. 10 and 11 show the detectors 8 and 9 in the case where the disk plane is at a nearer distance than a focused position of the objective lens 4, respectively.

Description is first made to the case where quantities of incident light to the two detectors 8 and 9 are balanced.

When the disk plane 30 is at a focused position of the objective lens 4, light divided by the beam splitter 7 is concentrated on the focuses F and F'. Accordingly, the spot diameter $\phi SA$ of the light beam S incident to the detector 8 is equal to the spot diameter $\phi SB$ of the light beam S incident to the detector 9 as shown in FIGS. 6 and 7 and the degrees of diffusion thereof are identical.

Since the area of the central light receiving plane A of the detector 8 is equal to the area of the central light receiving plane B of the detector 9, the central quantities a and b of received light in the (equation-1) are equal to each other.

Further, as far as the quantities of incident light to the two detectors 8 and 9 are balanced, the whole quantities of received light of both the detectors 8 and 9 are naturally balanced. Accordingly, since the whole quantities of received light a+a' and b+b' in the (equation-1) are equal and are handled as constants, the (equation-1) can be transformed into the following (equation-2) and the servo system serves to maintain the present state.

$$FES = ka - ka = 0 \quad \text{(Equation-2)}$$

$$\text{where } k = \frac{1}{a+a'} = \frac{1}{b+b'}$$

Then, when the disk plane 30 is at a farther distance than the focused position of the objective lens 4, light divided by the beam splitter 7 is concentrated before the focuses F and F'.

Accordingly, as shown in FIGS. 8 and 9, a relation of $\phi SA < \phi SB$ is formed between the spot diameter $\phi SA$ of light beam projected on the detector 8 and the spot diameter $\phi SB$ of light beam projected on the detector 9. Thus, since the light beam incident to the light receiving plane B is spread as compared with the light beam incident to the light receiving plane A, a relationship of a > b is formed between the central quantities a and b of received light in the (equation-1).

On the other hand, as long as the quantities of incident light to the two detectors 8 and 9 are balanced, the whole quantities of received light of the detectors 8 and 9 are balanced regardless of the size of the spot diameter of incident light beam and accordingly the whole quantities a+a' and b+b' of received light in the (equation-1) are equal and handled as a constant.

Thus, the (equation-1) can be transformed into the following (equation-3) and the driver 13 supplies a positive current to the focus coil 14a.

$$FES = ka - kb > 0 \quad \text{(Equation-3)}$$

where (a > b)

When the positive current is supplied to the focus coil 14a, the actuator main portion 15 is moved up by electromagnetic force acting between the focus coil 14a and the yoke 19 so that the objective lens 4 approaches the disk plane 30 to concentrate to the focused position.

When the disk plane 30 is at a nearer distance than the focused position of the objective lens 4, since light divided by the beam splitter 7 is concentrated to farther positions than the focuses F and F', a relationship of $\phi SA > \phi SB$ is formed between the spot diameter $\phi SA$ of light beam projected on the detector 8 and the spot diameter $\phi SB$ of light beam projected on the detector 9 as shown in FIGS. 10 and 11. Accordingly, a relationship of a < b is formed between the central quantities a and b of received light in the (equation-1) since the incident light beam to the light receiving plane A is spread as compared with the incident light beam to the light receiving plane B.

Accordingly, the (equation-1) can be transformed into the following (equation-4) and the driver 13 supplies a negative current to the focus coil 14a.

$$FES = ka - kb < 0 \quad \text{(Equation-4)}$$

where (a < b)

When the negative current is supplied to the focus coil 14a, the actuator main portion 15 is moved down by electromagnetic force acting between the focus coil 14a and the yoke 19 and the objective lens 4 is separated from the disk plane 30 to concentrate to the focused position.

A description follows for the case where quantities of incident light to the two detectors 8 and 9 are unbalanced.

When a ratio of the whole quantities a+a' and b+b' of received light of the two detectors 8 and 9 is R1:R2 (where R1+R2=2 and R1 R2), a relationship of R1:R2 is formed between the central quantities a and b of received light of the detectors 8 and 9 in the same manner as described above.

Accordingly, the (equation-1) can be transformed into the following (equation-5).

$$FES = \frac{R1a}{R1(a + a')} - \frac{R2b}{R2(b + b')} \quad \text{(Equation-5)}$$

In this equation, R1 and R2 in the numerator and the denominator cancel each other and accordingly the (equation-5) is the same as the (equation-1). Even if the quantities of incident light between the two detectors were unbalanced, the whole servo system operates in quite the same manner as the case the quantities of incident light described above is not unbalanced and the objective lens 4 tracks the focused positon regardless of the unbalance of the quantities of incident light.

As apparent from the foregoing description, the first embodiment constructs the servo system so that the difference of the ratio of the central quantity of received light to the whole quantity of received light of the detectors is reduced to 0.

Accordingly, the foregoing description has been made on the assumption that the two detectors 8 and 9 have the same shape in order to simplify the description and the circuit configuration, while the detectors having different shape can be used by giving proper weight to a gain of an input signal in a circuit manner or adjusting a distance from the focal positon of the detectors even if the same detectors can not be used because of arrangement space of the like.

Further, the present invention is directed to the adjustment of focus and accordingly in order to simplify the description and the circuit configuration thereof there has been described the example in which the peripheral light receiving plane is merely provided at the periphery of the central light receiving plane, while the detectors are usually used in the tracking control in addition to the focusing control. In this case, the central light receiving plane and the peripheral light receiving plane are generally divided into two right and left portions and the tracking control is made on the basis of a ratio of right and left light quantities.

In this manner, when the central light receiving plane and the peripheral light receiving plane are divided into the two portions, an adder for adding quantities of right and left received light is added before the circuit shown in FIG. 5 so that the present invention can be applied as is.

Figure 12:
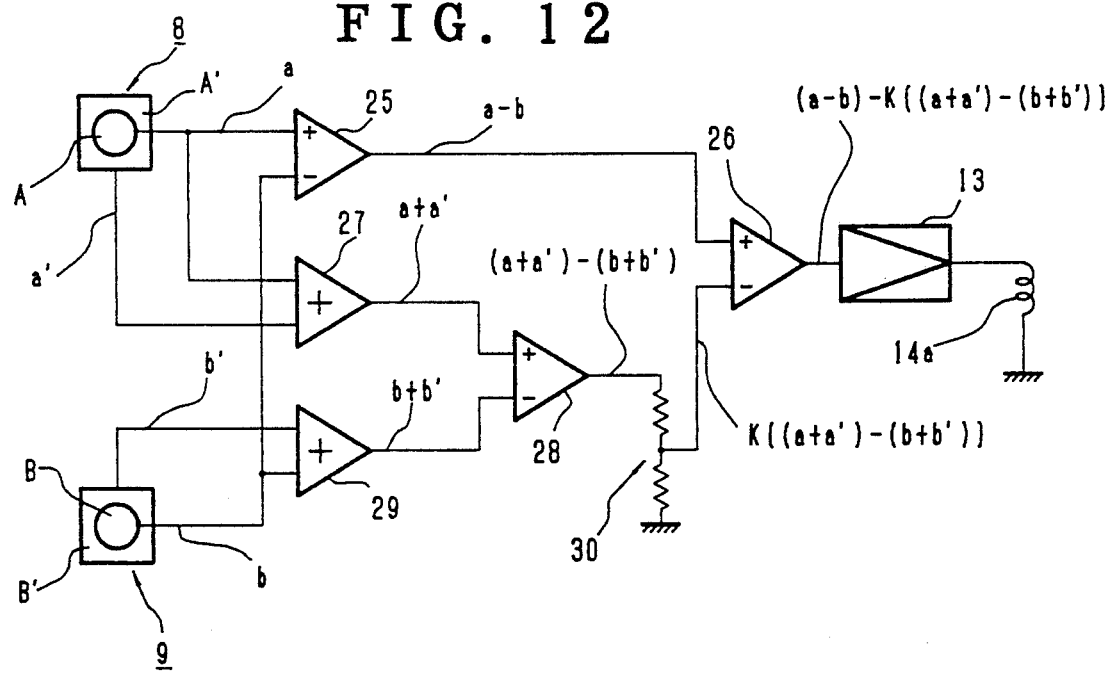
FIG. 12 is a circuit diagram of a focusing servo system of an optical pickup apparatus according to a second embodiment of the present invention.

FIG. 12 shows an example of a driving circuit according to another embodiment of the present invention.

Numeral 25 denotes a subtracter for calculating a difference of the output a of the central light receiving plane A of the detector 8 and the output b of the central light receiving plane B of the detector 9. An output (a−b) of the subtracter 25 represents an output difference of the central light receiving planes A and B of the detectors 8 and 9. The output (a−b) of the subtracter 25 is applied to a non-inverted input of a subtracter 26.

Numeral 27 denotes an adder for adding the output a of the central light receiving plane A and the output a' of the peripheral light receiving plane A' of the detector 8.

An output (a+a') of the adder 27 represents the whole quantity of received light of the detector 8 and is applied to a non-inverted input of a subtracter 28.

Similarly, numeral 29 denotes an adder for adding the output b of the central light receiving plane B and the output b' of the peripheral light receiving plane B' of the detector 9.

An output (b+b') of the adder 19 represents the whole quantity of received light of the detector 9 and is applied to an inverted input of the subtracter 28.

The subtracter 28 subtracts the inverted input from the non-inverted input and accordingly an output (a+a')−(b+b') thereof represents a difference of the whole quantity of received light of the detector 8 and the whole quantity of received light of the detector 9.

The output of the subtracter 28 is multiplied by a predetermined constant K in a voltage divider 30 to be applied to the inverted input of the subtracter 26.

The constant K of the voltage divider 30 represents a component ratio (a/a+a') of the central quantity a of received light to the whole quantity (a+a') of received light of the detector 8 in the focused state.

In the embodiment, since the detectors 8 and 9 have the same shape, the constant K also represents a component ratio (b/b+b') of the central quantity b of received light to the whole quantity (b+b') of received light of the detector 9 in the focused state.

As described above, since the output of the subtracter 28 represents the difference of the whole quantity of received light of the detector 8 and the whole quantity of received light of the detector 9, the inverted input of the subtracter 26 represents a component corresponding to the central light receiving planes A and B of the difference of the whole quantity of received light of the detectors 8 and 9 in the focused state.

The non-inverted input of the subtracter 26 is supplied with the output (a−b) of the subtracter 25 representative of the output difference of the central light receiving planes A and B of the detectors 8 and 9 and accordingly the focus error signal FES produced by the subtracter 26 represents a value obtained by removing a component corresponding to the central light receiving plane of the difference of the whole quantity of received light of the detectors 8 and 9 in the focused state from the output difference of the central light receiving planes A and B of the two detectors 8 and 9.

The focus error signal FES produced by the subtracter 26 is applied to the driver 13 to control the focus coil 14a.

As apparent from the foregoing description, the focus error signal FES is expressed by the following (equation-6).

$$FES = (a-b) - K\{(a+a') - (b+b')\} \quad \text{(Equation-6)}$$

The operation of the embodiment is described below with reference to the foregoing description and FIGS. 6 to 11.

First of all, a description follows for the case where the quantities of incident light to the two detectors 8 and 9 are balanced.

When the quantities of incident light to the two detectors 8 and 9 are balanced, the whole quantities (a+a') and (b+b') of received light of the detectors are equal and accordingly (a+a')−(b+b') in the (equation- 6) is 0.

Accordingly, since the output of the subtracter 25 of FIG. 12 is the output of the subtracter 26 as is, the (equation-6) can be transformed into the following (equation-7).

$$FES = a - b \quad \text{(Equation-7)}$$

When the disk plane 30 is at a focused position of the objective lens 4, light divided by the beam splitter 7 is concentrated to the focuses F and F'. Accordingly, as shown in FIGS. 6 and 7, the spot diameter $\phi SA$ of light beam S incident to the detector 8 is equal to the spot diameter $\phi SB$ of light beam incident to the detector 9 and the same degree of diffusion is shown. Thus, since the quantities of received light per unit area of the detectors 8 and 9 are equal, values a and b of the (equation-7) are also equal.

Accordingly, since the focus error signal FES of the (equation-7) is reduced to 0, the servo system serves to maintain the present state.

When the disk plane 30 is at a farther distance than the focused position of the objective lens 4, light divided by the beam splitter 7 is concentrated before the focuses F and F'. Accordingly, as shown in FIGS. 8 and 9, a relationship of $\phi SA < \phi SB$ is formed between the spot diameter $\phi SA$ of light beam projected on the detector 8 and the spot diameter $\phi SB$ of light beam projected on the detector 9. Since the incident light beam to the light receiving plane B is spread as compared with the incident light beam to the light receiving plane A, a relation of a>b is formed between the values a and b of the (equation-7).

Accordingly, the (equation-7) can be transformed into the following (equation-8) and the driver 13 supplies a positive current to the focus coil 14a.

$$FES = a - b > 0 \quad \text{(Equation-8)}$$

where (a>b)

When the positive current is supplied to the focus coil 14a, the actuator main portion 15 is moved up by electromagnetic force acting between the focus coil 14a and the yoke 19 and the objective lens 4 approaches the disk plane 30 to concentrate to the focused position.

When the disk plane 30 is at a nearer distance than the focused position of the objective lens 4, light divided by the beam splitter 7 is concentrated behind the focuses F and F' and accordingly as shown in FIGS. 10 and 11 a relationship is formed between the spot diameter $\phi SA$ of light beam projected on the detector 8 and the spot diameter $\phi Sb$ of light beam projected on the detector 8. The incident light beam to the light receiving plane A is spread as compared with the incident light beam to the light receiving plane B and accordingly a relationship of a<b is formed between values a and b of the (equation-7).

Thus, the (equation-7) can be transformed into the following (equation-9) and the driver 13 supplies a negative current to the focus coil 14a.

$$FES = a - b < 0 \quad \text{(Equation-9)}$$

where (a<b)

When the negative current is supplied to the focus coil 14a, the actuator main portion 15 is moved down by electromagnetic force acting between the focus coil 14a and the yoke 19 and the objective lens 4 is separated from the disk plane 30 to concentrate to the focused position.

A description follows for the case where the quantities of incident light to the two detectors 8 and 9 are unbalanced.

When a ratio of the whole quantities (a+a') and (b+b') of received light of the two detectors 8 and 9 is R1:R2 (where R1+R2=2 and R1 R2), the relation R1:R2 is formed between the quantities a and b of received light of the central light receiving plane of the detectors 8 and 9 in the focused state in the same manner as above.

Further, as described above, the output (a+a')−(b+b') of the subtracter 28 expressed in braces of the (equation-6) represents unbalance between the whole quantities of received light of the detectors 8 and 9.

The output of the subtracter 28 is multiplied by the predetermined constant K in the voltage divider 30 to be applied to the inverted input of the subtracter 26. The constant K multiplied by the voltage divider 30 represents a component ratio (a/a+a') of the central quantity a of received light to the whole quantity (a+a') of received light of the detector in the focused state and a component ratio (b/b+b') of the central quantity b of received light to the whole quantity (b+b') of received light of the detector 9. Accordingly, a component corresponding to the unbalance of the central quantity of received light in the focused position of unbalance in the light quantity produced in the whole quantity of received light of the detectors 8 and 9 is supplied to the inverted input of the subtracter 26.

On the other hand, the output of the subtracter 25 representative of the difference (a−b) of the central quantities of received light of the detectors 8 and 9 is applied to the non-inverted input of the subtracter 26.

However, when the whole quantities of received light of the two detectors 8 and 9 are unbalanced, the output (a−b) of the subtracter 15 contains unbalance component in the light quantity.

However, in the embodiment, since the subtracter 26 subtracts the output of the voltage divider 30 from the output of the subtracter 25 to produce the focus error signal FES and the output of the voltage divider 30 represents the component corresponding to the unbalance in the central quantity of received light in the focused position of the unbalance in the light quantity produced in the whole quantities of the received light of the detectors 8 and 9, the unbalance component in the light quantity produced in the two detectors 8 and 9 is removed from the focus error signal FES in the vicinity of the focused position.

The constant K set by the voltage divider 30 represents the component ratio (a/a+a') of the central quantity of received light to the whole quantity of received light in the focused state and accordingly when the disk plane goes away from the focused position, the correction value of unbalanced component of light quantity is increased or decreased, while since the unbalanced component of light quantity is reduced to 0 in the vicinity of the focused position, the objective lens 5 tracks the focused position regardless of unbalance of light quantity in the two detectors.

The fact that the focus error signal FES is reduced to 0 in the focused position is now described algebraically.

When the relationship of R1:R2 is formed between the whole quantities (a+a') and (b+b') of received light of the two detectors 8 and 9 as described above, the whole quantity of received light (b+b') of the detector 9 is given by the following (equation-10) and the central quantity of received light b of the detector 9 is given by the following (equation-11).

$$b + b' = \frac{R2}{R1}(a + a') \quad \text{(Equation-10)}$$

$$b = \frac{R2}{R1} a \quad \text{(Equation-11)}$$

When the equations are used to solve the (equation-6), the (equation-6) can be expanded as the following (equation-12). The focus error signal is reduced to 0 finally regardless of the unbalance of light quantity between the two detectors 8 and 9 and accordingly the whole servo system operates so that the objective lens 4 tracks the focused position regardless of the unbalance of light quantity between the detectors 8 and 9.

$$FES = \left(a - \frac{R2}{R1} a\right) - \frac{a}{a + a'}$$
$$\left\{(a + a') - \frac{R2}{R1L} - (a + a')\right\}$$
$$= \frac{R1 - R2}{R1} a - \frac{a}{a + a'} \cdot \frac{R1 - R2}{R1}(a + a')$$
$$= a - \frac{R1 - R2}{R1} a = \frac{R1 - R2}{R1} = 0 \quad \text{(Equation-12)}$$

As apparent from the foregoing description, in the second embodiment, the objective lens is servo driven so that the difference of the central quantity of received light of the two detectors is reduced to 0 and the component corresponding to the central quantity of received light in the focused position of the unbalance of light quantity produced in the whole quantity of received light of the detectors is subtracted from the difference of the central quantity of received light so that influence of the unbalance of light quantity can be removed in the focused position.

Accordingly, the above description has been made for the case where the two detectors 8 and 9 have the same shape in order to simplify the description and the circuit configuration, while detectors having different shapes can be used by giving proper weight to a gain of an input signal in a circuit manner or adjusting a distance from the focal position of the detectors even if the same detectors can not be used because of arrangement space or the like.

Figure 13:
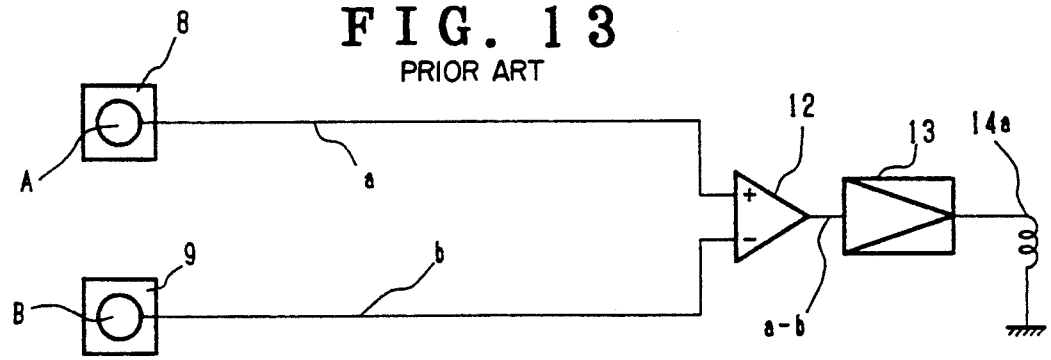
FIG. 13 is a circuit diagram of a focusing servo system of a conventional optical pickup apparatus.

Further, the present invention is directed to the adjustment of focus and accordingly in order to simplify the description and the circuit configuration thereof there has been described the example in which the peripheral light receiving plane is merely provided at the periphery of the central light receiving plane, while the detectors are usually used in the tracking control in addition to the focusing control. In this case, the central light receiving plane and the peripheral light receiving plane are generally divided into two right and left portions and the tracking control is made on the basis of a ratio of right and left light quantities. In this manner, when the central light receiving plane and the peripheral light receiving plane are divided into the two portions, an adder for adding quantities of right and left received light is added before the circuit shown in FIG. 13 so that the present invention can be applied as it is.

As described above, according to the present invention, even if an unbalance occurs in the quantity of incident light to the two detectors disposed before and after the focal position, the unbalance in the quantity of incident light is removed from the servo output in the focused position and the objective lens can track the focused position stably regardless of the unbalance in the quantity of incident light.

Thus, according to the present invention, requirement for adjustment accuracy of the ½-wavelength plate for adjusting the light quantities distributed to the two detectors is reduced and its adjustment is made easily.

Further, since crosstalk can be considered as unbalance in the incident light quantity caused by grooves, focus adjustment error due to crosstalk can be also prevented.

We claim:

1. A focus adjusting apparatus of an optical pickup apparatus in which light focused on a recording medium by a focusable objective lens and reflected on the recording medium is concentrated to first and second focuses through said objective lens, a focusing lens and an optical divider, and including a first optical detector disposed before the first focus and a second optical detector disposed after the second focus, whereby said objective lens is servo-controlled by outputs of said first and second optical detectors, wherein said first optical detector includes a central light receiving plane having an optical axis of said first optical detector centered therein and having a smaller area than that of a light spot irradiated by said focusing lens and a peripheral light receiving plane disposed at the periphery of said central light receiving plane and having a larger area including said central light receiving plane than that of the light spot, said second optical detector includes a central light receiving plane having an optical axis of said second optical detector centered therein and having a smaller area than that of a light spot irradiated by said focusing lens and a peripheral light receiving plane disposed at the periphery of said central light receiving plane and having a larger area including said central light receiving plane than that of the light spot, said focus adjusting apparatus comprising means for calculating a ratio of a quantity of received light of said central light receiving plane to the whole quantity of received light of said central light receiving plane and said peripheral light receiving plane of said first optical detector, means for calculating a ratio of a quantity of received light of said central light receiving plane to the whole quantity of received light of said central light receiving plane and said peripheral light receiving plane of said second optical detector, and servo driving means for controlling said objective lens so that a difference between the ratio of the quantity of received light of said central light receiving plane to the whole quantity of received light of said central light receiving plane and said peripheral light receiving plane of said first optical detector and the ratio of the quantity of received light of said central light receiving plane to the whole quantity of received light of said central light receiving plane and said peripheral light receiving plane of said second optical detector is reduced to 0.

2. A focus adjusting apparatus of an optical pickup apparatus according to claim 1, wherein a distance of the first focus and said first optical detector is equal to a distance of the second focus and said second optical detector, and each of said optical detectors includes said central light receiving plane and said peripheral light receiving plane having the same shape.

3. A focus adjusting apparatus of an optical pickup apparatus in which light focused on a recording medium by a focusable objective lens and reflected on the recording medium is concentrated to first and second focuses through said objective lens, a focusing lens and an optical divider, and including a first optical detector disposed before the first focus and a second optical detector disposed after the second focus, whereby said objective lens is servo-controlled by outputs of said first and second optical detectors, wherein said first optical detector includes a central light receiving plane having an optical axis of said first optical detector centered therein and having a smaller area than that of a light spot irradiated by said focusing lens and a peripheral light receiving plane disposed at the periphery of said central light receiving plane and having a larger area including said central light receiving plane than that of the light spot, said second optical detector includes a central light receiving plane having an optical axis of second optical detector centered therein and having a smaller area than that of a light spot irradiated by said focusing lens and a peripheral light receiving plane disposed at the periphery of said central light receiving plane and having a larger area including said central light receiving plane than that of the light spot, said focus adjusting apparatus comprising means for calculating a central difference of a quantity of received light which is a difference between a quantity of received light of said central light receiving plane of one optical detector and a quantity of received light of said central light receiving plane of the other optical detector, means for calculating the whole difference of a quantity of received light which is a difference between the whole quantity of received light of said central light receiving plane and said peripheral light receiving plane of one optical detector and the whole quantity of received light of said central light receiving plane and said peripheral light receiving plane of the other optical detector, means for calculating a correction value by multiplying the calculated whole difference of the quantity of received light by a component ratio of the central quantity of received light to the whole quantity of received light in the focused position, and servo driving means for controlling said objective lens so that a value obtained by subtracting the calculated correction value from the central differences of quantity of received light of said respective optical detectors is reduced to 0.

4. A focus adjusting apparatus of an optical pickup apparatus according to claim 3, wherein a distance of the first focus and said first optical detector is equal to a distance of the second focus and said second optical detector, and each of said optical detectors includes said central light receiving plane and said peripheral light receiving plane having the same shape.

5. A focus adjusting apparatus of an optical pickup apparatus in which light focused on a recording medium by a focusable objective lens and reflected on the recording medium is concentrated to first and second focuses through said objective lens and an optical divider, and including a first optical detector disposed before the first focus and a second optical detector disposed after the second focus, whereby said objective lens is servo-controlled by outputs of said first and second optical detectors, wherein said first optical detector includes a central light receiving plane shaped circularly having an optical axis of said first optical detector centered therein and having a smaller area than that of a light spot irradiated by said focusing lens and a peripheral light receiving plane disposed at the periphery of said central light receiving plane and having a larger area including said central light receiving plane than that of the light spot, said second optical detector includes a central light receiving plane shaped circularly having an optical axis of said second optical detector centered therein and having a smaller area than that of a light spot irradiated by said focusing lens and a peripheral light receiving plane disposed at the periphery of said central light receiving plane and having a larger area including said central light receiving plane than that of the light spot, said focus adjusting apparatus comprising first means for calculating a ratio of a quantity of received light of said central light receiving plane to the whole quantity of received light of said central light receiving plane and said peripheral light receiving plane of said first optical detector, second means for calculating a ratio of a quantity of received light of said central light receiving plane to the whole quantity of received light of said central light receiving plane and said peripheral light receiving plane of said second optical detector, and servo driving means for controlling said objective lens so that a difference between the ratio which was calculated by said first means and the ratio which was calculated by said second means is reduced to 0.

6. A focus adjusting apparatus of an optical pickup apparatus according to claim 5, wherein a distance of the first focus and said first optical detector is equal to a distance of the second focus and said second optical detector, and each of said optical detectors includes said central light receiving plane and said peripheral light receiving plane having the same shape.

7. A focus adjusting apparatus of an optical pickup apparatus in which light focused on a recording medium by a focusable objective lens and reflected on the recording medium is concentrated to first and second focuses through said objective lens, a focusing lens and an optical divider, and including a first optical detector disposed before the first focus and a second optical detector disposed after the second focus, whereby said objective lens is servo-controlled by outputs of said first and second optical detectors, wherein said first optical detector includes a central light receiving plane shaped circularly having an optical axis of said first optical detector centered therein and having a smaller area than that of a light spot irradiated by said focusing lens and a peripheral light receiving plane disposed at the periphery of said central light receiving plane and having a larger area including said central light receiving plane than that of the light spot, said second optical detector includes a central light receiving plane shaped circularly having an optical axis of said second optical detector centered therein and having a smaller area than that of a light spot irradiated by said focusing lens and a peripheral light receiving plane disposed at the periphery of said central light receiving plane and having a larger area including said central light receiving plane than that of the light spot, said focus adjusting apparatus comprising first means for calculating a central difference which is a difference between a quantity of received light of said central light receiving plane of one optical detector and a quantity of received light of said central light receiving plane of the other optical detector, second means for calculating the whole difference which is a difference between the whole quantity of received light of said central light receiving plane and said peripheral light receiving plane of one optical detector and the whole quantity of received light of said central light receiving plane and said peripheral light receiving plane of the other optical detector, third means for calculating a correction value by multiplying whole difference which was calculated by said second means by a component ratio of the central quantity of received light to the whole quantity of received light in the focused position, and servo driving means for controlling said objective lens so that a value obtained by subtracting the correction value which was calculated by said third means from the central differences which was calculated by said first means is reduced to 0.

8. A focus adjusting apparatus of an optical pickup apparatus according to claim 7, wherein a distance of the first focus and said first optical detector is equal to a distance of the second focus and said second optical detector, and each of said optical detectors includes said central light receiving plane and said peripheral light receiving plane having the same shape.

* * * * *